(12) United States Patent
Sinha (10) Patent No.: US 8,146,073 B2
(45) Date of Patent: Mar. 27, 2012

(54) UPDATING SOFTWARE WHILE IT IS RUNNING

(75) Inventor: Suyash Sinha, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 2061 days.

(21) Appl. No.: 10/955,641

(22) Filed: Sep. 30, 2004

(65) Prior Publication Data
US 2006/0075076 A1 Apr. 6, 2006

(51) Int. Cl.
*G06F 9/44* (2006.01)
*G06F 9/46* (2006.01)

(52) U.S. Cl. ......... 717/170; 717/169; 717/171; 718/108

(58) Field of Classification Search .................. None
See application file for complete search history.

(56) References Cited

U.S. PATENT DOCUMENTS

| | | | | |
|---|---|---|---|---|
| 5,155,837 A * | 10/1992 | Liu et al. | ...................... | 709/221 |
| 5,359,730 A * | 10/1994 | Marron | ......................... | 717/169 |
| 5,410,703 A * | 4/1995 | Nilsson et al. | ................ | 717/168 |
| 5,664,195 A * | 9/1997 | Chatterji | ...................... | 717/178 |
| 6,070,012 A * | 5/2000 | Eitner et al. | .................. | 717/168 |
| 6,138,274 A * | 10/2000 | Huang et al. | .................. | 717/168 |
| 6,154,878 A * | 11/2000 | Saboff | ......................... | 717/173 |
| 6,199,203 B1 * | 3/2001 | Saboff | ......................... | 717/168 |
| 6,314,567 B1 * | 11/2001 | Oberhauser et al. | .......... | 717/170 |
| 6,347,396 B1 * | 2/2002 | Gard et al. | .................... | 717/168 |
| 6,629,315 B1 * | 9/2003 | Naylor | ......................... | 717/168 |
| 6,698,017 B1 * | 2/2004 | Adamovits et al. | .......... | 717/168 |
| 6,978,452 B2 * | 12/2005 | Oesterreicher et al. | ....... | 717/171 |
| 7,000,229 B2 * | 2/2006 | Gere | .............................. | 717/169 |
| 7,062,765 B1 * | 6/2006 | Pitzel et al. | ................... | 717/177 |
| 7,089,550 B2 * | 8/2006 | Bakke et al. | .................. | 717/173 |
| 7,174,547 B2 * | 2/2007 | Wang et al. | ................... | 717/172 |
| 2002/0073409 A1 * | 6/2002 | Lundback et al. | ............ | 717/170 |
| 2002/0162049 A1 | 10/2002 | Takamoto et al. | | |
| 2003/0018950 A1 | 1/2003 | Sparks et al. | | |
| 2003/0191870 A1 | 10/2003 | Duggan | | |
| 2004/0010786 A1 * | 1/2004 | Cool et al. | .................... | 717/170 |
| 2004/0060044 A1 * | 3/2004 | Das et al. | ...................... | 717/171 |

(Continued)

FOREIGN PATENT DOCUMENTS

DE 19810802 A1 9/1999
JP 2002-328813 A 11/2002

OTHER PUBLICATIONS

Gupta et al., "On-line Software Version Change Using State Transfer Between Processes" published by Jonh Wiley & Sons, Ltd, Sep. 1993, pp. 949-964.*

(Continued)

*Primary Examiner* — Tuan Dam
*Assistant Examiner* — Zheng Wei
(74) *Attorney, Agent, or Firm* — Woodcock Washburn LLP (57) ABSTRACT

To avoid extensive time during which servicing of clients' requests is stopped for updating a piece of software or a data structure, various embodiments of the invention update an instance of the piece of software or an instance of the data structure instead of updating the original piece of software or the data structure. This allows the original piece of software or the data structure to service clients' requests without interruption. The updated instance begins to service clients' requests without losing context while the original piece of software or the data structure is terminated from further operation.

17 Claims, 12 Drawing Sheets

U.S. PATENT DOCUMENTS

| | | | |
|---|---|---|---|
| 2004/0230970 A1* | 11/2004 | Janzen | 717/174 |
| 2005/0044301 A1* | 2/2005 | Vasilevsky et al. | 711/1 |
| 2005/0216920 A1* | 9/2005 | Tewari et al. | 719/324 |
| 2006/0010440 A1* | 1/2006 | Anderson et al. | 718/1 |
| 2007/0083861 A1* | 4/2007 | Becker et al. | 717/174 |

OTHER PUBLICATIONS

IBM, "Server Consolidation with the IBM eServer xSeries 440 and VMware ESX Server " Nov. 2002, pp. 1-54.*

* cited by examiner

UPDATING SOFTWARE WHILE IT IS RUNNING

FIELD OF THE INVENTION

The present invention relates generally to software releases, and more particularly, to dynamically updating software so as to add new features or correct errors in software while it is running.

BACKGROUND OF THE INVENTION

Figure 1:
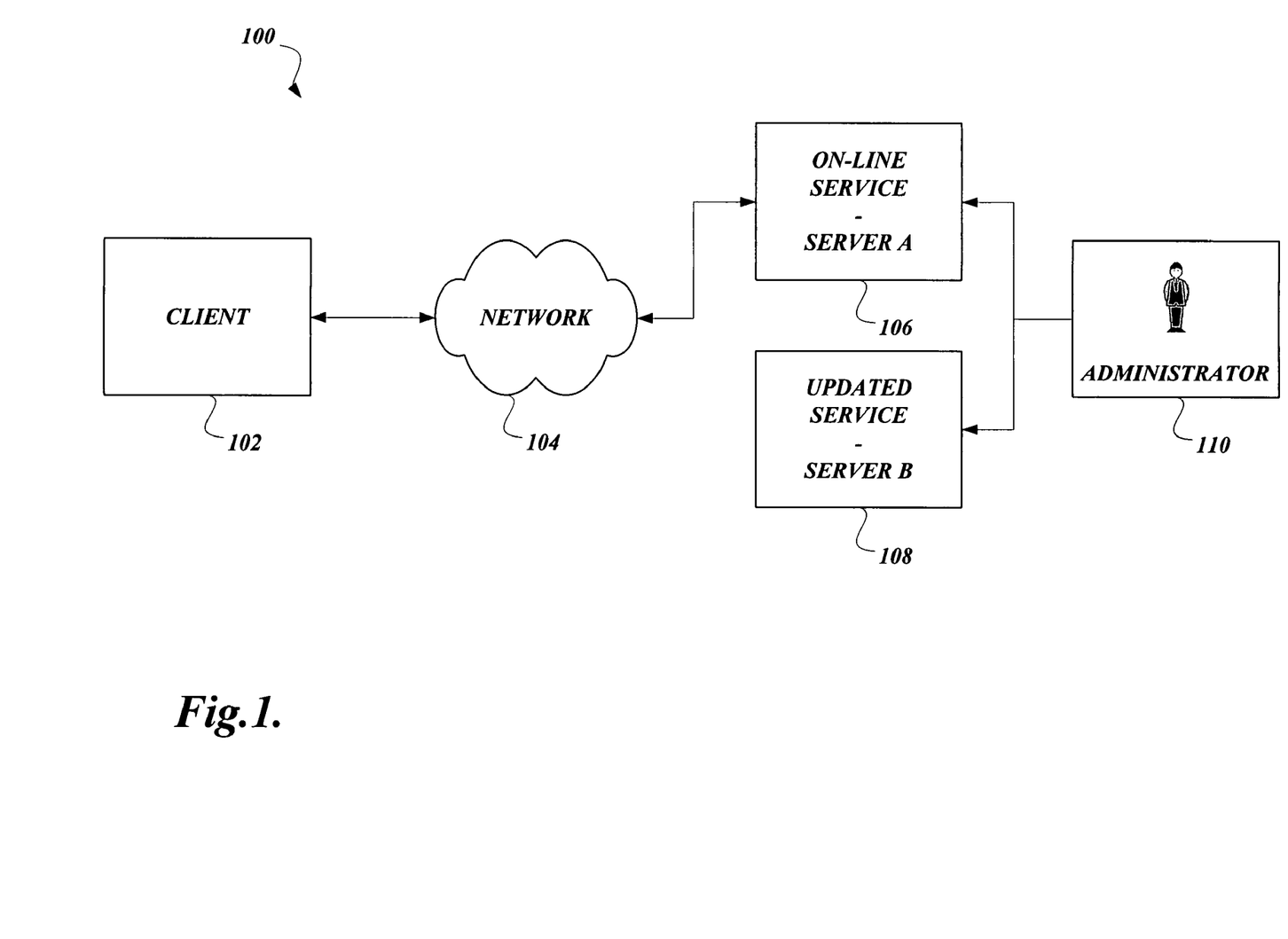
FIG. 1 is a block diagram illustrating a conventional enterprise network system showing various problems of patching a piece of software while it is running.

In a large enterprise, such as a corporation, computing resources are interconnected by a network of computer systems owned by the enterprise, which fulfill the enterprise's various computing needs. This network can span diverse geographical locations. Internal users (employees) as well as external clients (customers) of the enterprise need the enterprise's computing resources to be highly available and yet also highly secure. In reality, sometimes these two requirements work against each other. For example, to make the computing resources secure, the computing resources have to be brought down often to install security patches. On the other hand, to make the computing resources readily available with continuous frequency, only rarely should the computing resources be brought down. FIG. 1 illustrates these and other problems in greater detail.

An enterprise network 100 includes a client 102, which is a computer through which a user accesses shared computing resources interconnected via the network 104. These computing resources of the enterprise network 100 are provided by one or more servers, such as a server A 106, on which an on-line service is running. To make the on-line service executing on the server A 106 more secure, the enterprise often sets, as a matter of policy, for an administrator 110 to patch the on-line service with security fixes for reported or discovered vulnerabilities. Such patches are carried out by installing and applying the patch to a copy of the on-line service (updated service) running on a server B 108, which acts as a test machine. The administrator 110 verifies and validates the updated service in accordance with the computing policies of the enterprise to make sure that upon deployment, the updated service would be unlikely to cause problems. The server B 108 on which the updated service is tested is physically a different machine from the server A 106 on which the on-line service is providing services to the client 102. After the updated service has passed the testing on the server B 108, the administrator 110 deploys the patch by bringing down the server A 106 for some period of time during which the on-line service is no longer available to the client 102. The patch is then applied to the on-line service after which the server A 106 is brought back up to provide services to the client 102 again.

The problem with bringing down the server A 106 so as to install the patch is that the service context is lost at the time the server A 106 is brought down, and remains inactive. The service context is a state in which the client 102 has provided requests or some information to the on-line service running on the server A 106. There is an expectation by the client 102 that the on-line service will service the request or provide some computation in connection with the provided information. When the on-line service is brought down, such service context is destroyed. When the server A 106 is brought back up again with the patched on-line service, it is unlikely that the server A 106 can remember what the client 102 has previously provided because many services either do not persistently store the service context or the delays caused by the reboot of the server A 106 is too long to be acceptable to the client 102. For example, the client 102 may have sent a search query to the on-line service just prior to the server A 106 to be brought down. When the on-line service is active again with the patch, no response to the prior query will be provided by the on-line service, hence confusing the client 102. Another solution, albeit an expensive one, is to run the on-line service on a cluster-based server platform with redundancy built into the server by adding additional processing capacity to mirror the server 106, but this raises not only the costs of procuring equipment but also the costs of operating the equipment.

Without a resolution to the problem of satisfying the growing requirements of highly secured software while making the highly secured software highly available to users, users may eventually no longer trust the enterprise network 100 to provide a desired computing experience, causing demand for the enterprise network 100 to diminish in the marketplace. Thus, there is a need for a system, method, and computer-readable medium for dynamically updating software while avoiding or reducing the foregoing and other problems associated with existing systems.

SUMMARY OF THE INVENTION

In accordance with this invention, a system, method, and computer-readable medium for dynamically updating software is provided. The system form of the invention includes a computer system acting as a server for serving clients' requests. The computer system comprises a piece of software executing on the computer system for servicing a request of a client, the piece of software being capable of receiving a context provided by the client. The computer system further comprises an instance of the piece of software that has been updated with a new release of the piece of software. The instance of the piece of software is executed contemporaneously with the piece of software on the computer system so as to allow tests to be performed after which the instance of the piece of software executes and the piece of software terminates without losing the context provided by the client.

In accordance with further aspects of this invention, another system form of the invention includes pieces of software (executing in a computer system) for controlling the transition of one service mode to another service mode. The pieces of software include a service for servicing requests of clients. The service includes a mode among multiple modes that allows the service to obtain a handoff lock and export the state of the service. The pieces of software include a service control manager for causing the service to enter into a particular mode by invoking an assigned callback routine associated with the particular mode. One particular mode includes a customizable mode that allows the service to obtain the handoff lock and export the state of the service.

In accordance with further aspects of this invention, a computer-readable medium form of the invention includes a computer-readable medium having a data structure stored thereon for use by a computing system to export state of a service. The data structure comprises a service internal context tag that is indicative of information pertaining to the internal context generated by the service in servicing a client. The data structure further comprises a client external context tag that is indicative of information pertaining to the external context provided by the client in its request to perform a service.

In accordance with further aspects of this invention, a method implemented on a computer system includes receiving updates to a first service running on a first guest operating system that runs on the computer system, the first service performing requests of clients. The method further includes performing a state handoff by the first service to produce a file containing the state of the first service. The file is exported to an instance of the first service running on a second guest operating system that runs on the computer system. The method yet further includes executing by the instance of the first service, which is updated by the received updates, to service requests of clients and terminating the first service without losing the context provided by the clients to the first service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

To avoid having extensive time during which servicing of clients' requests is stopped for updating a piece of software or a data structure, various embodiments of the invention update an instance of the piece of software or an instance of the data structure instead of updating the original piece of software or the data structure. This allows the original piece of software or the data structure to service clients' requests without interruption. When the updated instance of the piece of software or the instance of the data structure has satisfactorily passed verification and validation, various embodiments of the present invention allow the original piece of software or the data structure to momentarily pause to export its state to the updated instance. The updated instance begins to service clients' requests without losing context while the original piece of software or the data structure is terminated from further operation. The term "a piece of software" means the inclusion of a service running in application mode; a service running in privileged mode; or a portion of the service running in application mode or in privileged mode (e.g., a code fragment).

Figure 2:
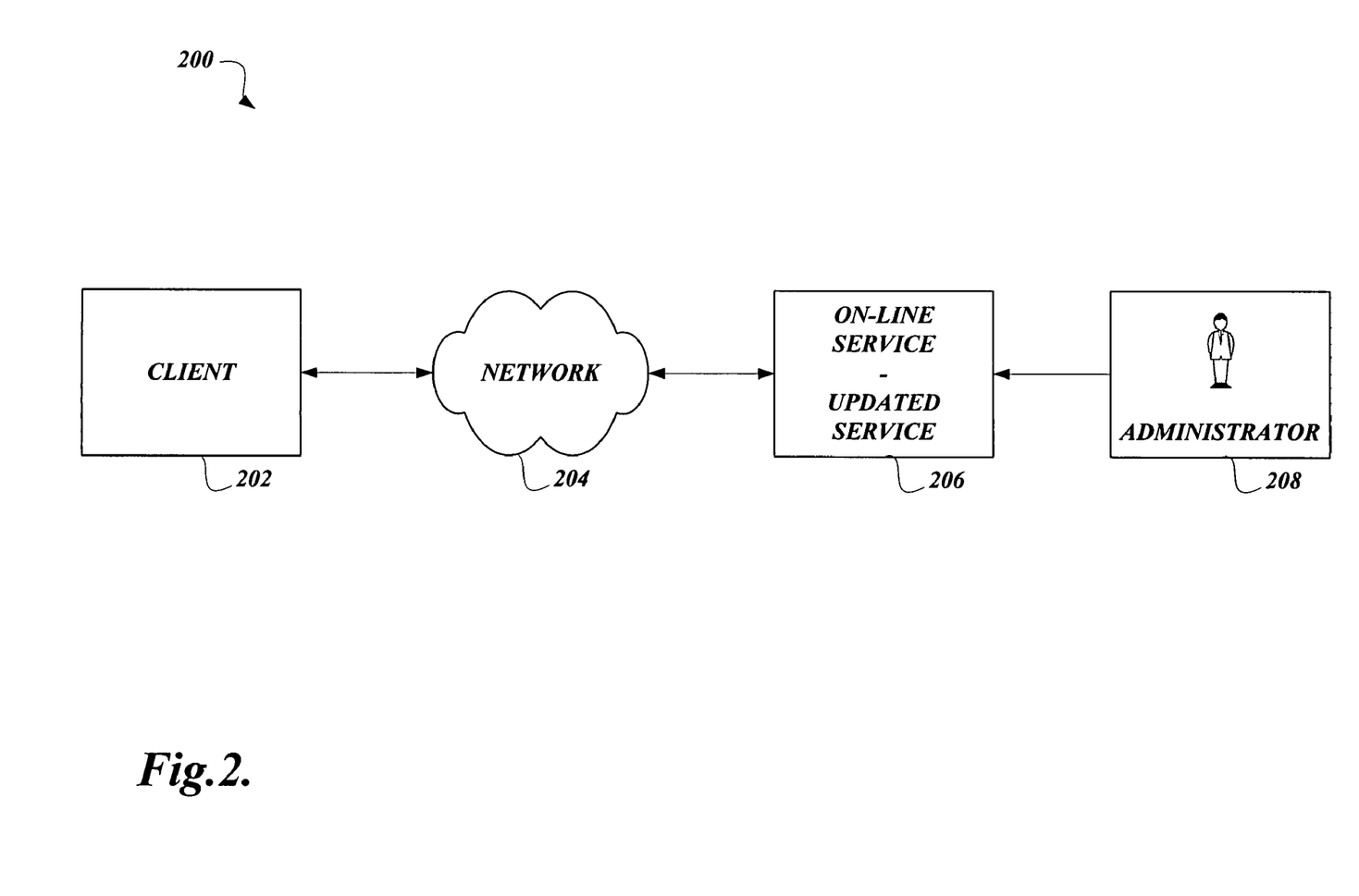
FIG. 2 is a block diagram illustrating an exemplary system in which a piece of software is updated as it is being executed.

A system 200 in which services can be dynamically updated while they are running is illustrated at FIG. 2. The system 200 includes a client 202 communicating over a network 204 to a server 206. Together, the client 202 and the server 206 form a type of computer network architecture called a client/server architecture. Client/server architecture composed from the client 202 and the server 206 is an arrangement that makes use of disputed intelligence, treating both the server 206 and the individual client 202 as intelligent, programmable devices, thus exploiting the full computing power of each. This is done by splitting the processing of a computing task, such as a search process, between two distinct components: "Front-end" client 202 and "back-end" server 206. The client 202, itself a complete, stand-alone personal computer (versus the "dumb" terminal found in older architecture), offers its users a full range of power and features for initiating the computing task. The server 206, which can be another personal computer, mini-computer, or mainframe, enhances the client 202 by providing the traditional strengths offered by minicomputers and mainframes in a time-sharing environment, such as data storage, data management, information sharing among clients, sophisticated network administration, security features, and servicing various computing tasks requested by clients, such as the client 202.

The network 204 is a group of computers and associated devices that are connected by communication facilities. The network 204 can involve permanent connections, such as coaxial or other cables, or temporary connections made through telephone or other communication links. The network 204 can be as small as a LAN (local area network) consisting of a few computers, printers, and other devices, or it can consist of many small and large computers distributed over a vast geographical area (WAN or wide area network). One exemplary implementation of a WAN is the Internet, which is a worldwide collection of networks and gateways that use the TCP/IP suite of protocols to communicate with one another. The heart of the Internet is the backbone of high-speed data communication lines between major nodes or host computers, including thousands of commercial, government, educational, and other computer systems that route data and messages. One or more Internet nodes can go off-line without endangering the Internet or causing communications on the Internet to stop, because no single computer or network controls the entire Internet.

Using various embodiments of the present invention, the on-line service can be virtually updated to create an updated service without bringing the server 206 down, hence allowing the on-line service to continue to provide services to the client 202 without interruption. An administrator 208 can test the updated service while the on-line service continues to perform computing tasks as requested by the client 202. When the administrator 208 is satisfied that the updated service, if deployed, would be unlikely to cause problems to the system 200, the administrator 208 can cause the updated service to begin servicing the requests of the client 202 while the on-line service is uninstalled without the client 202 realizing that there has been a change. Various embodiments of the present invention allow the state stored by the on-line service to be seamlessly transferred to the updated service without losing the context relied upon by the client 202.

Using the virtual update capability of various embodiments of the present invention, the administrator 208 creates a new instance of the on-line service running in an instance of an operating system, which itself runs in parallel to the on-line service and the operating system on which the on-line service is running. The administrator 208 installs and applies the updates to the instance of the on-line service (updated service). The administrator 208 then tests and if the testing is successful, the administrator 208 determines that the updated service can be deployed in the system 200. The administrator 208 then causes the on-line service to perform a context handoff to the instance of the on-line service. After the context handoff is completed, the updated service begins to execute at a point where the on-line service left off just prior to the context handoff.

Figure 3A:
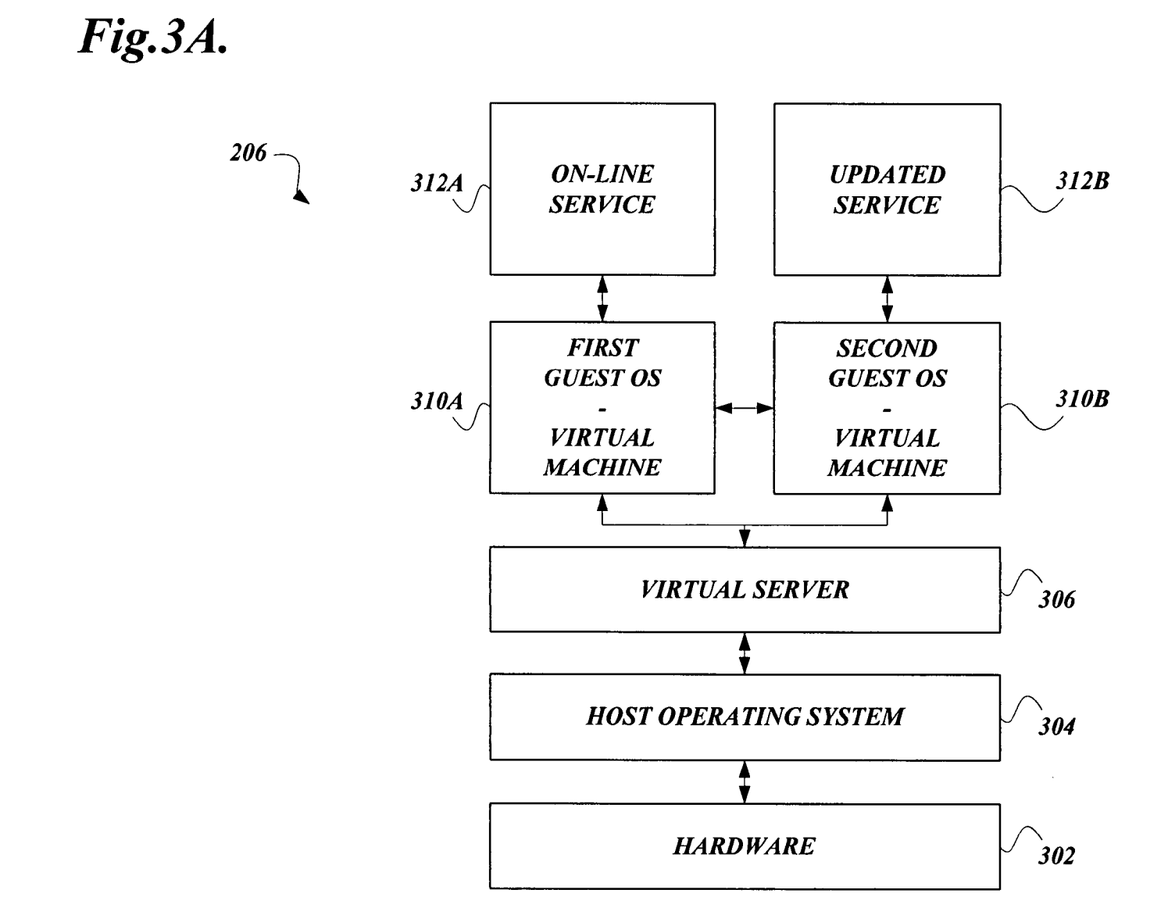
FIG. 3A is a block diagram illustrating pieces of a system that allow multiple operating systems to be executed so as to support updating of a copy of the service while the service is being executed, in accordance with one embodiment of the present invention.

FIG. 3A illustrates the server 206, on which both the on-line service and the updated service can run, in greater detail. The server 206 includes pieces of hardware 302, which are the physical components of the server 206, including a central processing unit (not shown) and memory, as well as peripheral equipment, such as printers, modems, and input devices. Running on top of the hardware 302 is a host operating system 304 that controls the allocation and usage of hardware resources mentioned before, such as central processing unit time, memory, disk space, and peripheral devices. The host operating system 304 is the core piece of software on which guest operating systems and other applications depend. Running in the host operating system 304 is a virtual server 306, which provides virtualization services that manage virtual machines 310A, 310B, and provides a software infrastructure for hardware emulation.

Virtual machines 310A, 310B include sets of virtualized devices that act as virtual hardware for each virtual machine 310A, 310B. First and second guest operating systems run in virtual machines 310A, 310B without fully recognizing that various instructions and communications are simulated by the virtual server 306 that eventually will be translated into proper hardware instructions carried out by the hardware 302. The virtual server 306, is in essence, a multi-threaded service running, preferably, in the privileged mode of the host operating system 304, with each virtual machine 310A, 310B executing in its own thread of execution. Whereas the host operating system 304 provides scheduling of central processing unit resources and time and device drivers, as well as provides access to the hardware 302, the virtual server 306 maintains a software infrastructure that creates the illusion of different machines (virtual machines 310A, 310B) on which guest operating systems can execute.

The on-line service 312A executes on the first guest operating system, which, in turn, executes on the virtual machine 310A. The instance of the on-line service that has been updated is the updated service 312B, which runs on the second guest operating system, and in turn the second guest operating system executes on the virtual machine 310B. Using virtualization technology, the administrator 208 can test the updated service 312B on the same hardware 302 that the on-line service 312A depends on to communicate with a client 202. Various embodiments of the present invention allow the state, which includes the internal context and the external context, of the on-line service 312A to be captured by the first guest operating system and transfer such state to the second guest operating system via a suitable interprocess communication facility (e.g., pipes or queues) between the virtual machines 310A, 310B. The state of the updated service 312B is then set to the state of the on-line service so that no context is lost when the on-line service 312A terminates execution and execution of the updated service 312B is started.

Figures 3B, 3C:
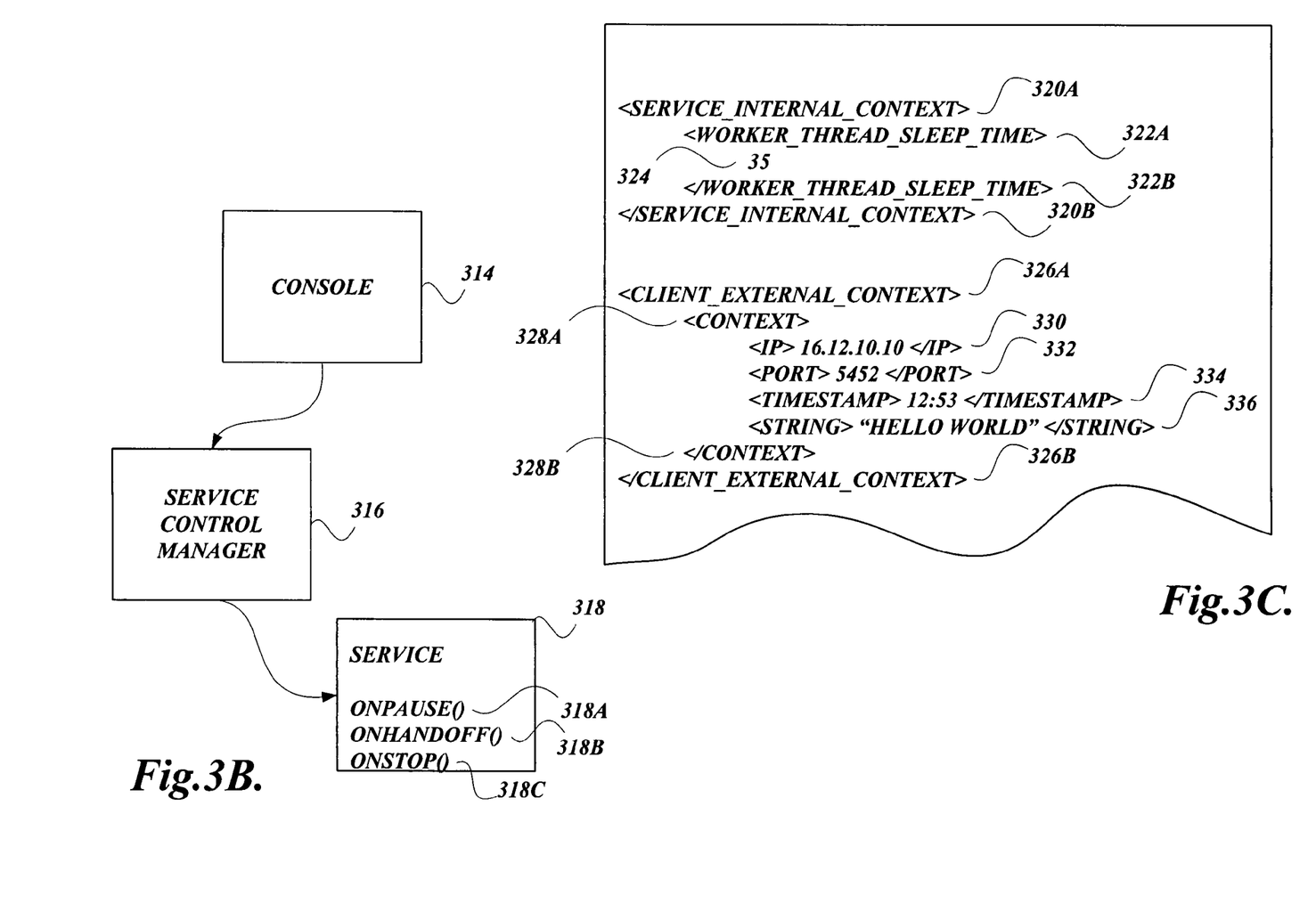
FIG. 3B is a block diagram illustrating pieces of a system for controlling services, in accordance with one embodiment of the present invention.
FIG. 3C is a textual diagram illustrating an example of a customizable, tag-based file that contains state information, in accordance with one embodiment of the present invention.
Figure 4A:
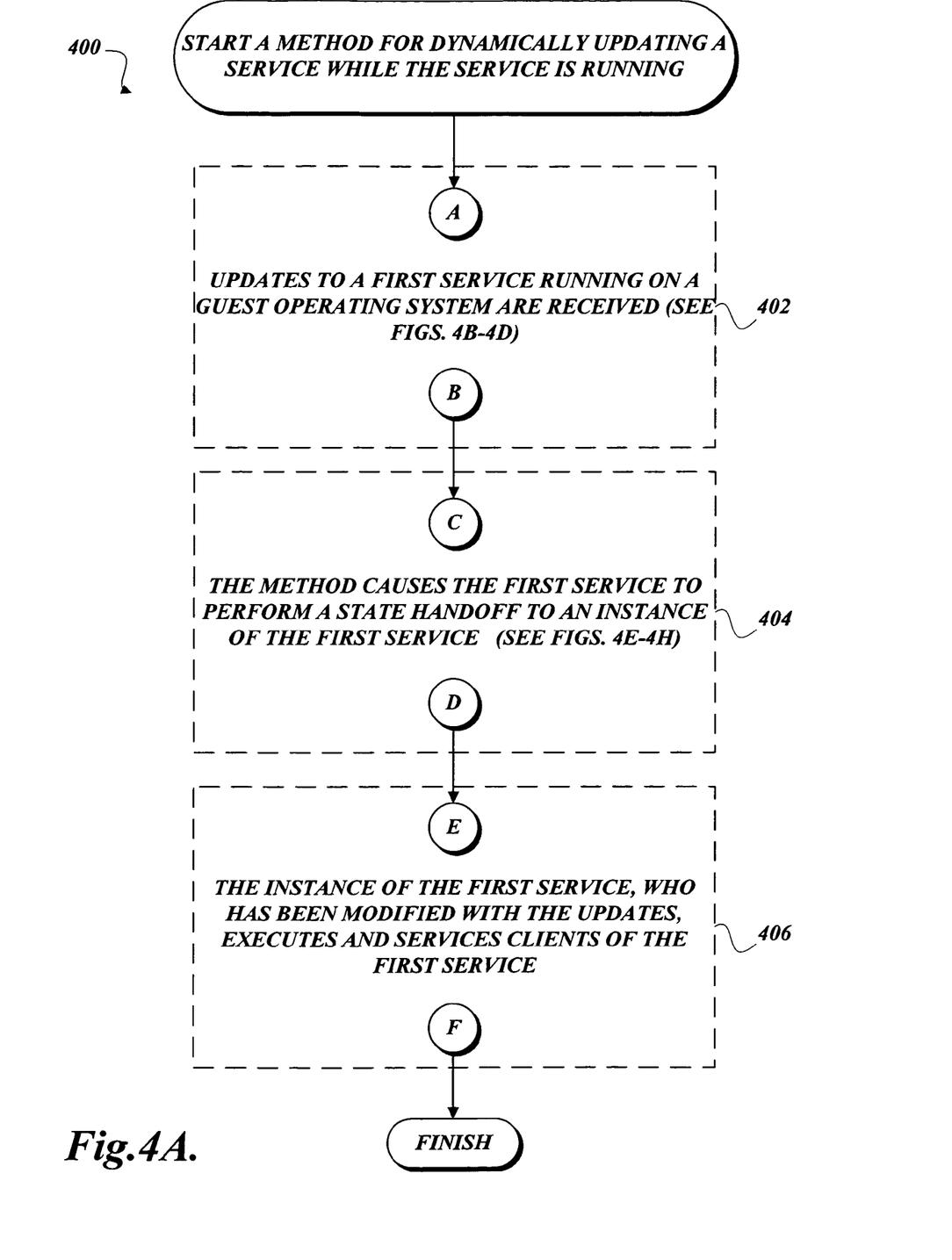
FIGS. 4A-4H are process diagrams illustrating a method for dynamically updating a service while the service is running.
Figure 4B:
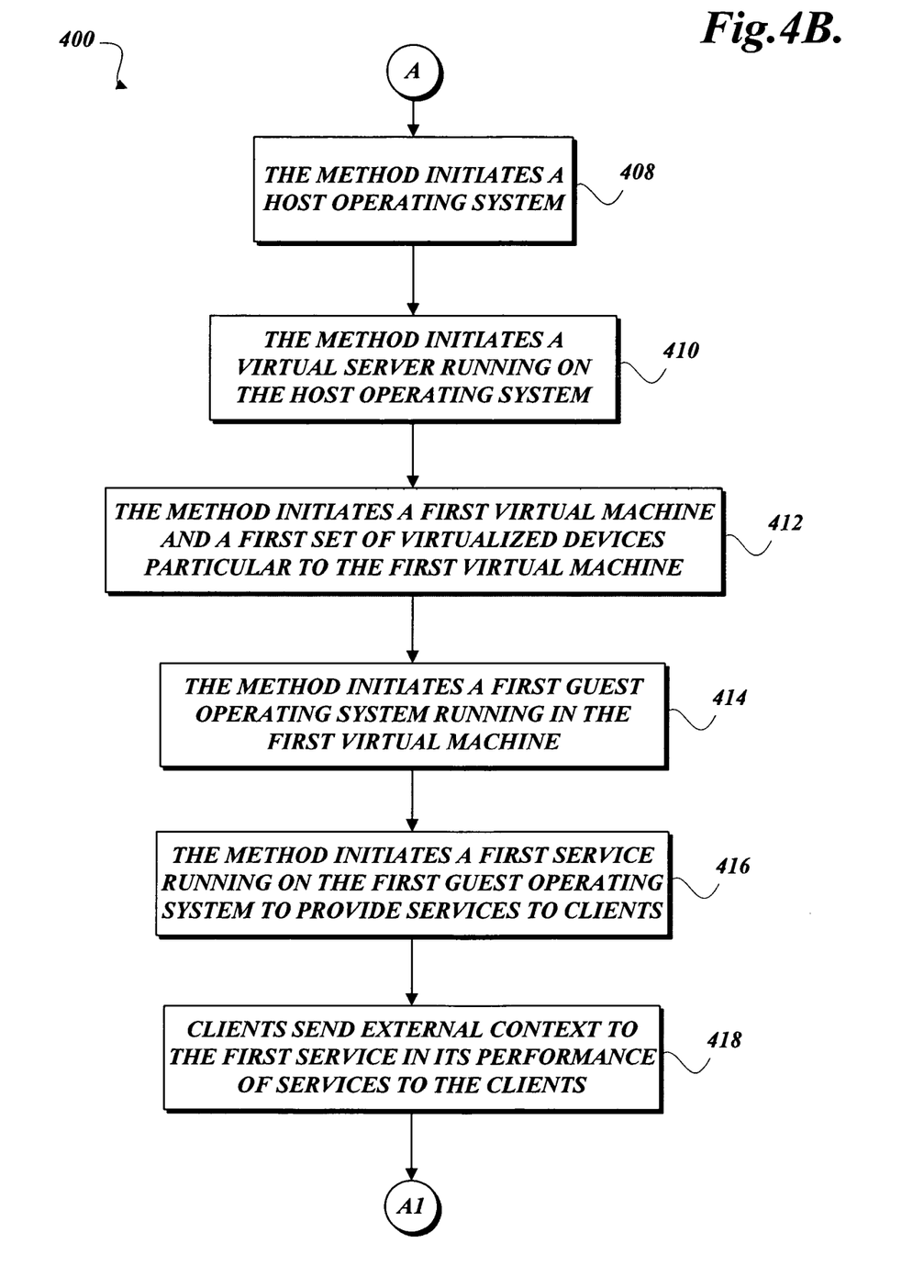
Figure 4C:
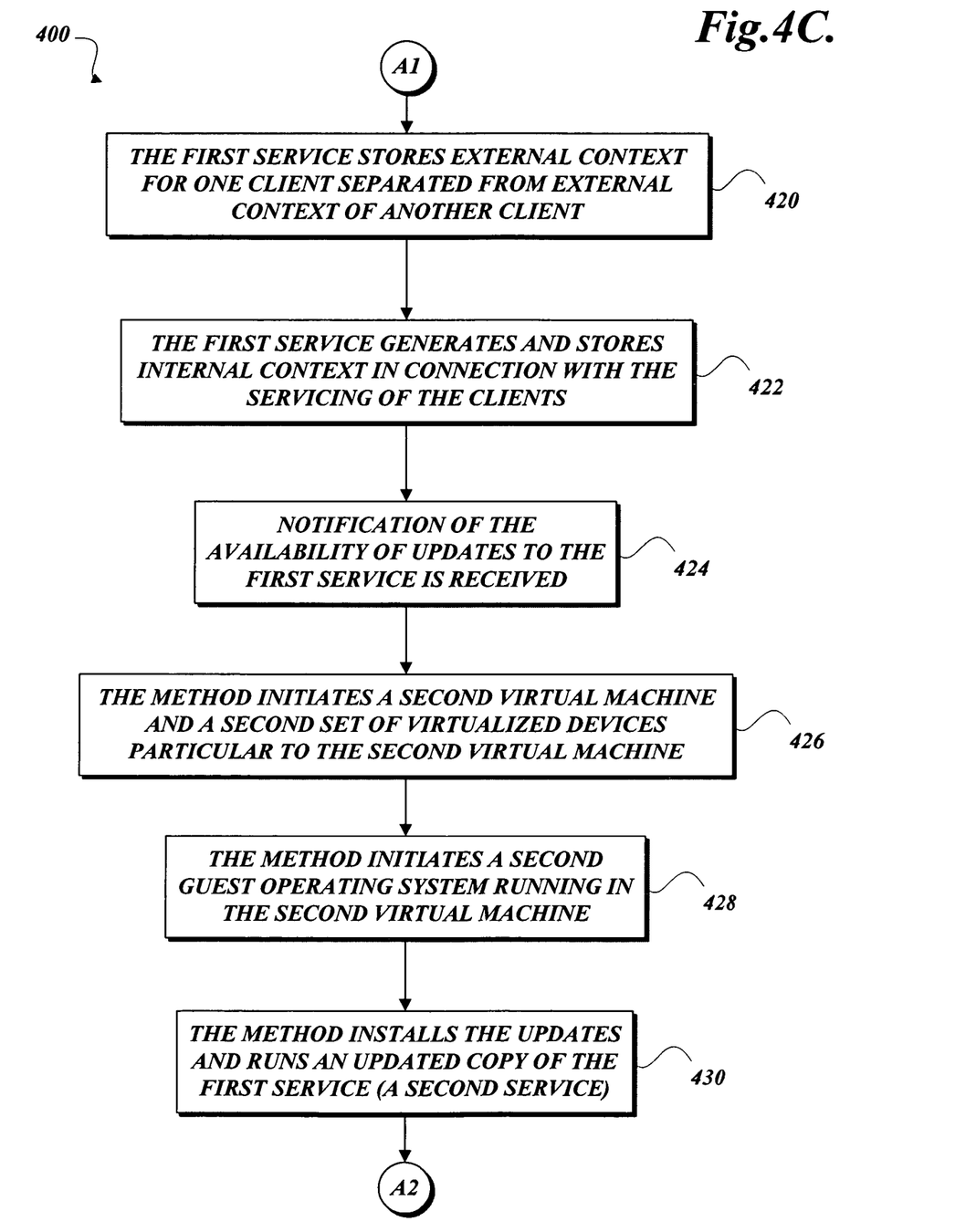
Figure 4D:
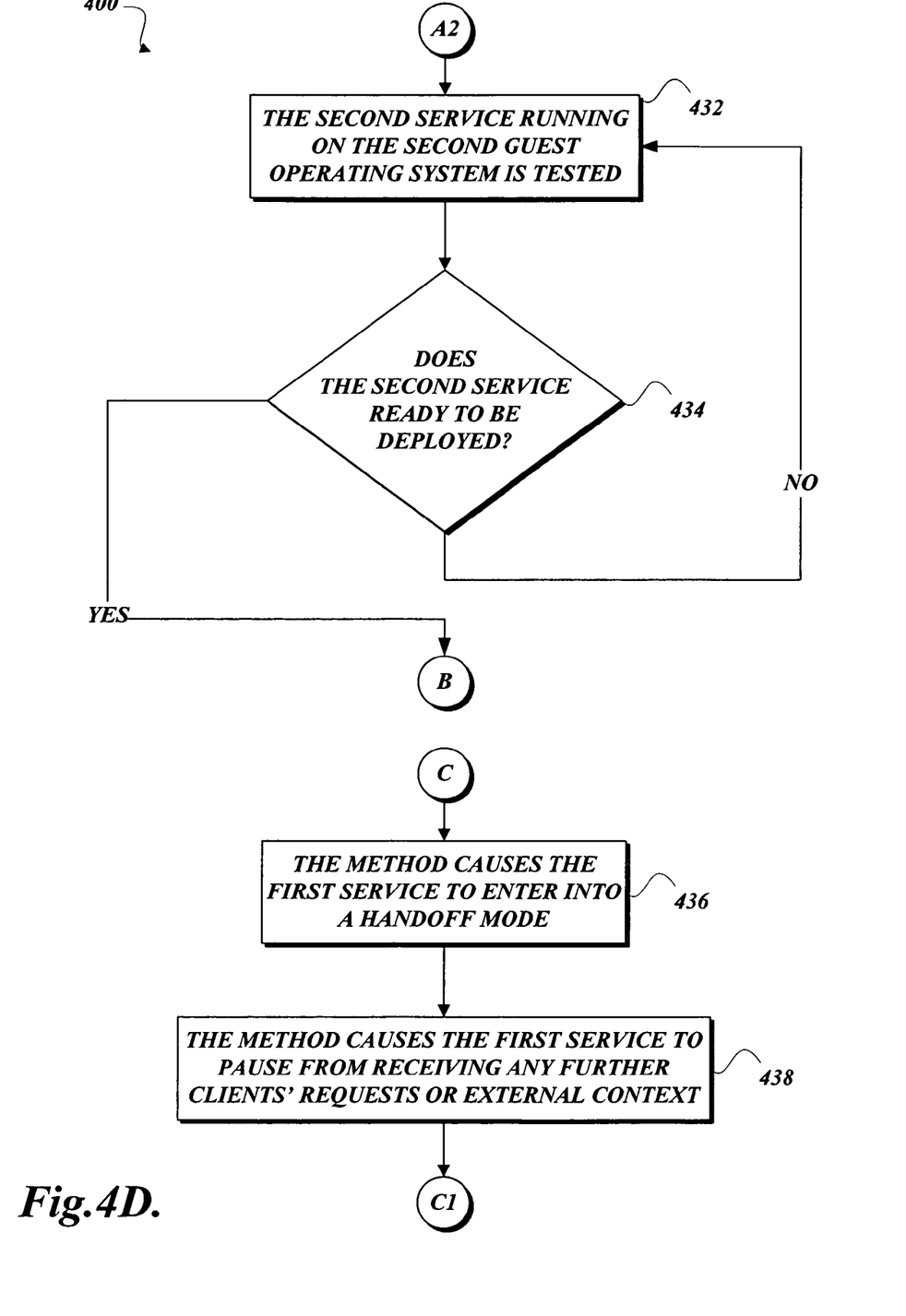
Figure 4E:
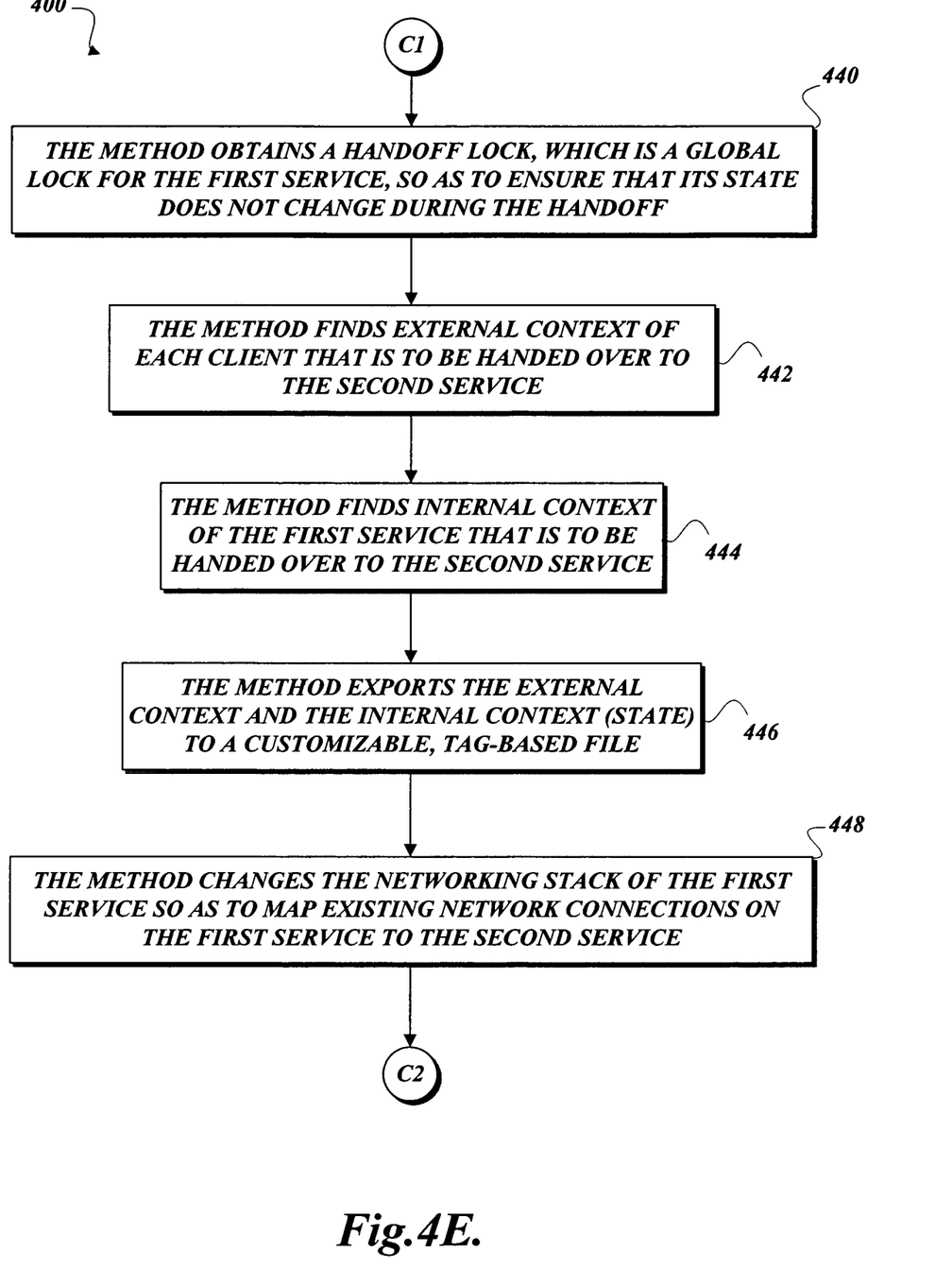
Figure 4F:
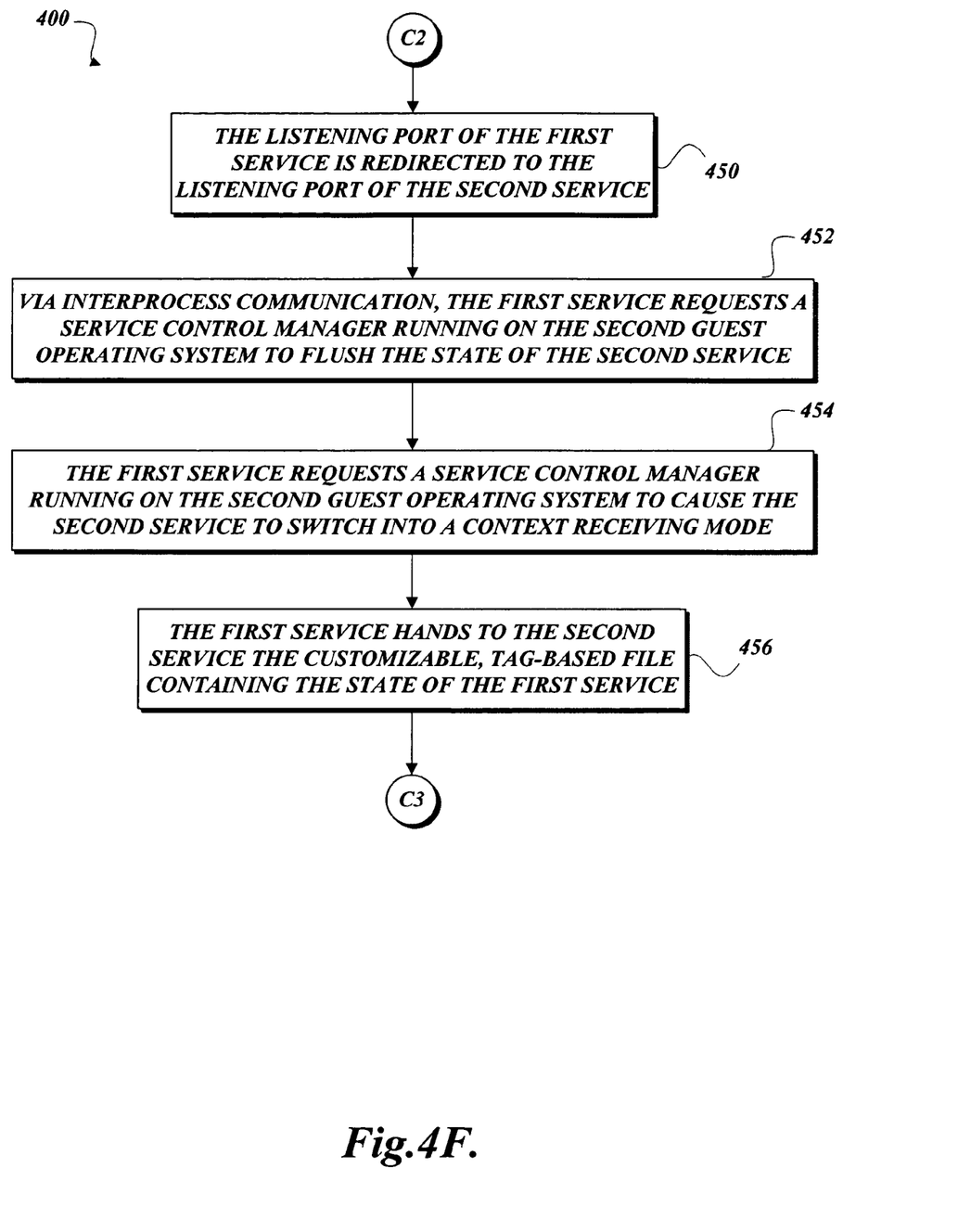
Figure 4G:
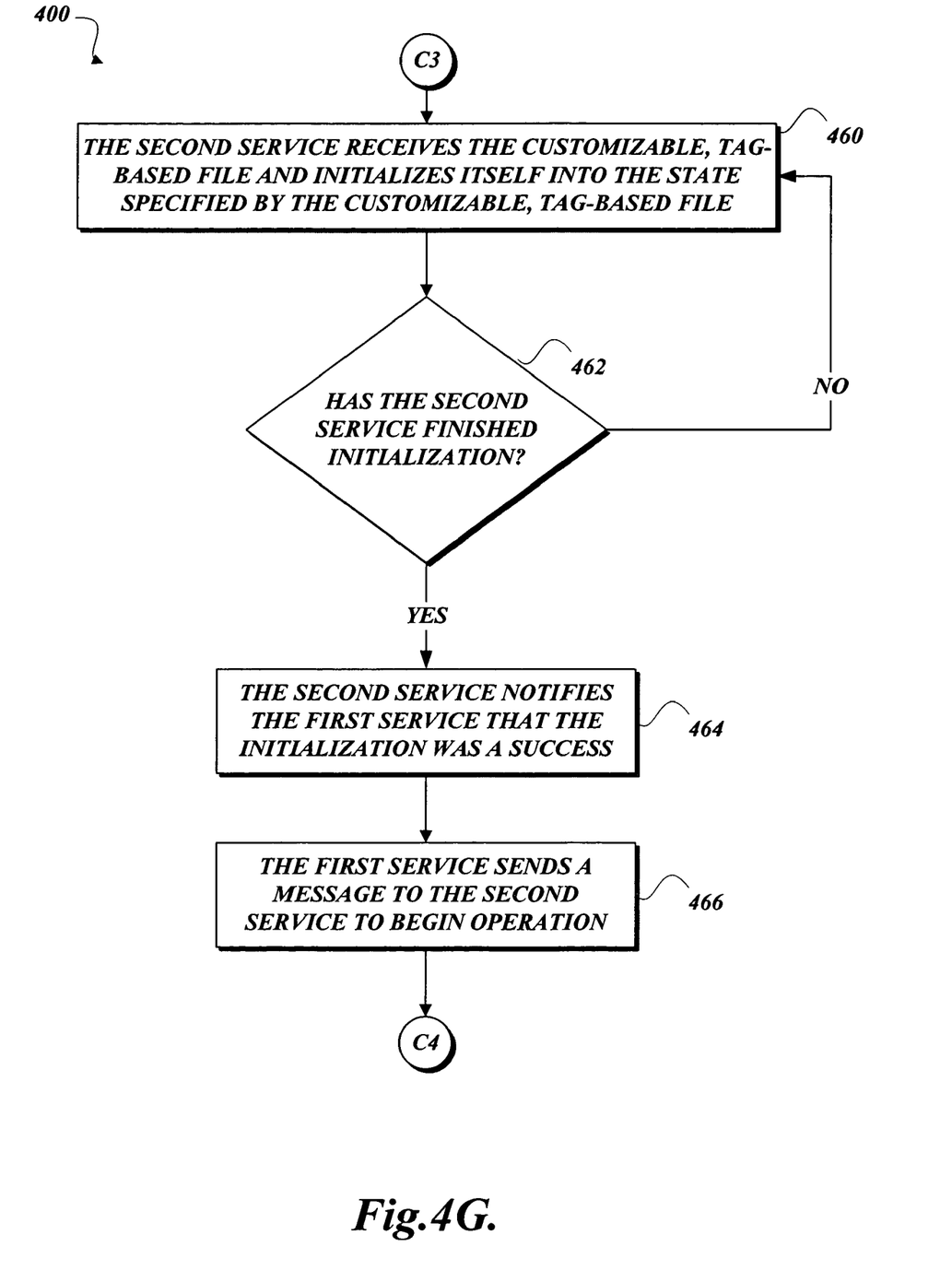
Figure 4H:
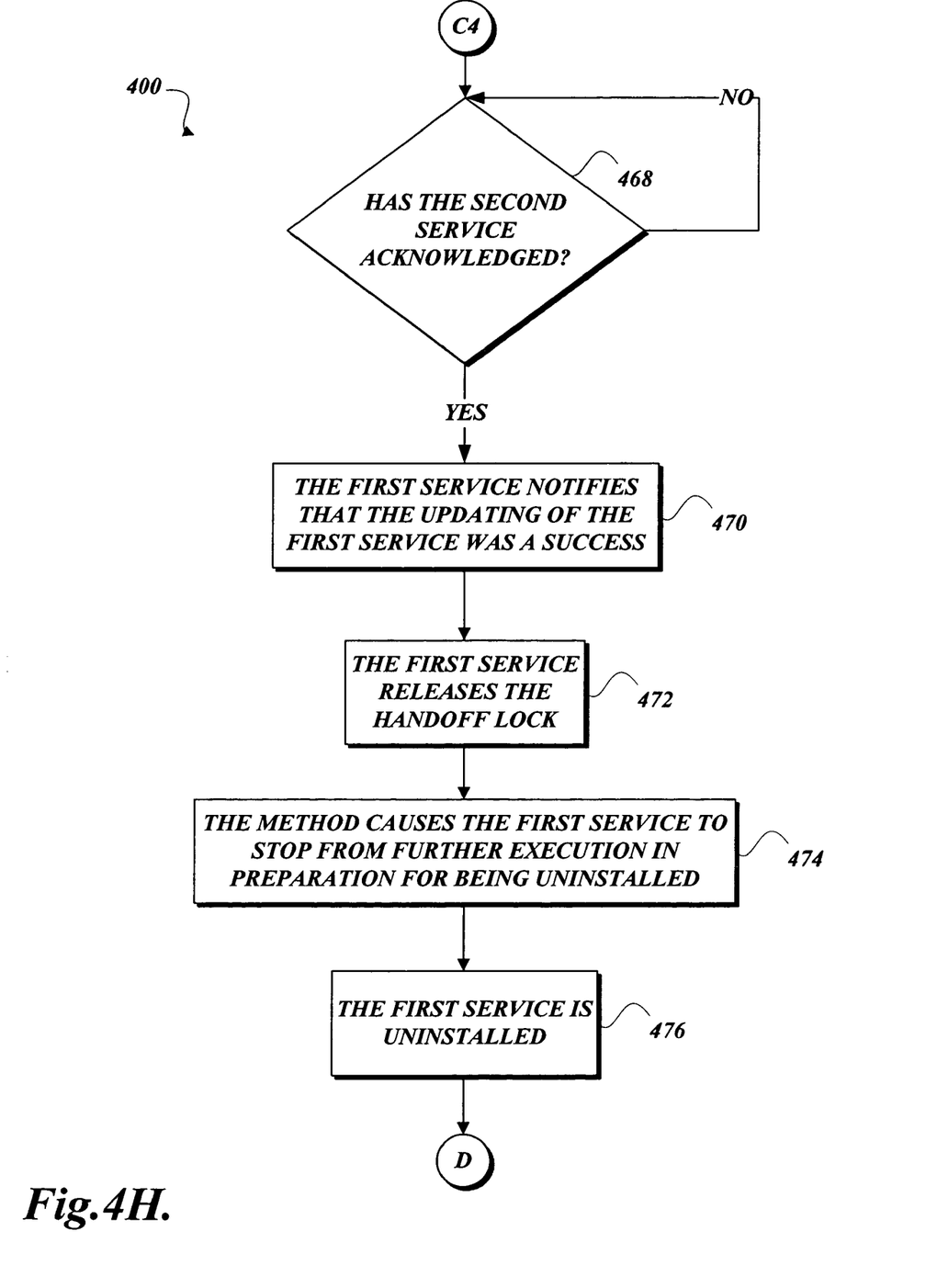

FIG. 3B illustrates the use of a service control manager 316 to manage various modes that the service 318 may be in, such as installation mode, start mode, paused mode, stop mode, uninstall mode, and so on. Associated with each mode is an assignable callback routine that can be called by the service control manager 316. Each mode is entered by the service 318 after the service control manager 316 calls the service using one of the callback routines. The service control manager 316 may be controlled by a console 314 or an automated script (not shown) among other suitable controlling mechanisms. A portion of the callback routines associated with the service 318 are illustrated, such as the ONPAUSE( ) routine 318A, the ONHANDOFF( ) routine 318B, and the ONSTOP( ) routine 318C. For example, when the service control manager 316 invokes the ONPAUSE( ) routine 318A, the service 318 enters into a pause mode (ceasing to receive further requests from the client 202) in which various instructions specified by the ONPAUSE( ) routine 318A are executed.

In one embodiment, if the service control manager 316 can invoke a custom command in which any arbitrary callback routine can be associated with the custom command, the ONHANDOFF( ) routine 318B can be associated with the custom command so as to expand the various modes of the service 318 to include a handoff mode. When the service 318 has entered the handoff mode, instructions connected with the ONHANDOFF( ) routine 318B can be executed to export the state of the first service 312A for importation into the updated service 312B. In another embodiment, instead of using a custom command, if a new handoff state can be made part of a service, such as the service 318, the ONHANDOFF( ) routine 318B can be associated with that mode. Preferably, in that particular example, one of the instructions in the ONHANDOFF( ) routine 318B cause the service to pause so as to avoid the receipt of additional requests from the client 202 while the preparation to switch the servicing from the on-line service 312A to the updated service 312B occurs.

FIG. 3C illustrates a file containing the state of the on-line service 312A to be exported to the updated service 312B during the handoff mode discussed hereinabove. The file can be written in any suitable language. One suitable language includes a customizable, tag-based language, such as Extensible Markup Language (XML). Consider the following example that leads to the production of the file illustrated at FIG. 3C. The on-line service 312A listens for requests from the client 202 on port 5452; the client 202 sends a character string ("hello world") to the on-line service 312A. The on-line service 312A stores the string, a current time stamp (which is 12:53), a client IP address (which is 16.12.10.10), and a client port 5452 as the client external context. Internally, within the on-line service 312A, a worker thread wakes up every 35 seconds to investigate a list of client contexts. If a client context has been stored for longer than a predetermined amount of time, the worker thread sends a packet to the client 202 with the string "hello world" previously provided by the client 202 to the on-line service 312A.

Both the internal context of the on-line service 312A as well as the external context of the client can be exported into the file illustrated at FIG. 3C. The file includes a beginning tag <SERVICE_INTERNAL_CONTEXT> 320A and its companion ending tag, </SERVICE_INTERNAL_CONTEXT> 320B. Contained within tags 320A, 320B are tag <WORKER_THREAD_SLEEP_TIME> 322A and its companion ending tag </WORKER_THREAD_SLEEP_TIME> 322B. A numerical value "35" is expressed on line 324 to indicate the sleep time of the worker thread. The file also includes a beginning tag <CLIENT_EXTERNAL_CONTEXT> 326A and its companion ending tag </CLIENT_EXTERNAL_CONTEXT> 326B. Nested between tags 326A, 326B is another beginning tag <CONTEXT> 328A and its companion ending tag </CONTEXT> 328B. Contained between tags 328A, 328B is a tag <IP> and its companion ending tag </IP> at line 330. An IP address of 16.12.10.10 is enclosed between tag <IP> and its ending tag </IP>. Line 332 expresses the port number 5452 between tag <PORT> and its companion ending tag </PORT>. The time "12:53" is captured between tag <TIMESTAMP> and its companion ending tag </TIMESTAMP> at line 334. Line 336 contains the string provided by the client 202 "hello world" contained between a tag <STRING> and its companion ending tag </STRING>. The details associated with the file discussed above should be understood in that the file is presented to illustrate the concept of capturing both the internal and external context of a service and is not meant to limit or restrict the capturing of the service's state to the particular types of information shown in FIG. 3C.

FIGS. 4A-4H illustrate a method 400 for dynamically updating a service while the service is running. For clarity purposes, the following description of the method 400 makes references to various elements illustrated in connection with the system 200, such as the client 202 and the server 206 (FIG. 2); the hardware 302, the host operating system 304, the virtual server 306, the virtual machines 310A, 310B, the on-line service 312A, and the updated service 312B (FIG. 3A); and the customizable, tag-based file illustrated in FIG. 3C. From a start block, the method 400 proceeds to a set of method steps 402, defined between a continuation terminal ("terminal A") and an exit terminal ("terminal B"). The set of method steps 402 describes that the updates to a first service are received, such as the on-line service 312A, running on a guest operating system.

In the following few steps, the initiation of the virtualization technology is discussed so as to allow various embodiments of the present invention to execute. From terminal A (FIG. 4B), the method 400 initiates the host operating system 304. See block 408. At block 410, the method initiates the virtual server 306 running in the host operating system 304. The method 400 proceeds to block 412 where the method initiates a first virtual machine, such as the virtual machine 310A, and a first set of virtualized devices particular to the first virtual machine. The method 400 initiates a first guest operating system running in the first virtual machine. See block 414. At block 416, the method initiates a first service, such as the on-line service 312A, running on the first guest operating system to provide services to clients, such as the client 202. At block 418, the clients send external context (such as a request or information connected with a request) to the first service. The method 400 then continues at another continuation terminal ("terminal A1").

From terminal A1 (FIG. 4C), the method 400 proceeds to block 420 where the first service, such as the on-line service 312A, stores external context for one client separated from the external context of another client. See the contents of tags 328A, 328B of FIG. 3C. Next, the first service generates and stores internal context in connection with the servicing of the clients. See block 422. See also the contents of tags 320A, 320B. At block 424, notification of the availability of updates to the first service is received. The method 400 then proceeds to block 426 where it initiates a second virtual machine, such as the virtual machine 310B, and a second set of virtualized devices particular to the second virtual machine. The method initiates a second guest operating system running in the second virtual machine. See block 428. At block 430, the method installs the updates and runs an updated copy of the first service (a second service, such as the updated service 312B). (Preferably, the second service executes contemporaneously with the first service.) The method 400 then continues at another continuation terminal ("terminal A2").

From terminal A2 (FIG. 4D), the method 400 proceeds to block 432 where the second service running on the second guest operating system is tested, such as by the administrator 208. A test is performed at decision block 434 to determine whether the second service is ready to be deployed. If the answer to the test at decision block 434 is NO, the method 400 loops back to block 432 where the above-described processing steps are repeated. If the answer to the test at decision block 434 is YES, the method 400 continues to the exit terminal B.

From terminal B (FIG. 4A), the method 400 proceeds to a set of method steps 404 defined between a continuation terminal ("terminal C") and an exit terminal ("terminal D"). The set of method steps 404 causes the first service to perform a state handoff to an instance of the first service (which is the second service or the updated service 312B). From terminal C (FIG. 4D), the method 400 proceeds to block 436 where it causes the first service to enter into a handoff mode. The method causes the first service to pause from receiving any further client requests or external context. See block 438. (One exemplary method is to cause the service control manager 316 to invoke the ONPAUSE( ) routine 318A.) The method 400 then continues to another continuation terminal ("terminal C1").

From terminal C1 (FIG. 4E), the method obtains a handoff lock, which is a global lock, for the first service, so as to ensure that its mode does not change during the handoff. See block 440. At block 442, the method finds the external context of each client that is to be handed over to the second service. Preferably, the method should find any client external context that needs to be exported to the second service. The method 400 proceeds to block 444 where it finds the internal context of the first service that is to be handed over to the second service. In some cases, it may include internal details such as a number of worker threads, internal queues, and service management data structures. The method exports the external context and the internal context (collectively, the state) to a customizable, tag-based file. See block 446. (For illustrative purposes only, the file shown at FIG. 3C is an example.) Next, at block 448, the method changes the networking stack of the first service so as to map existing network connections on the first service to the second service. (Preferably, the virtualization facility, which includes the virtual server 306 and the virtual machines 310A, 310B, exposes application programming interfaces to remap the existing network connections.) The method 400 then continues at another continuation terminal ("terminal C2").

From terminal C2 (FIG. 4F), the method 400 proceeds to block 450 where the listening port of the first service is redirected to the listening port of the second service so as to enable the second service to receive requests from clients. Via interprocess communication such as pipes or queues, the first service requests a service control manager, such as the service control manager 316, running on the second guest operating system, to flush the state of the second service. See block 452. (Preferably, this can be accomplished by invoking the ONSTOP( ) routine 318C of the second service.) Next, at block 454, the first service requests the service control manager running on the second guest operating system to cause the second service to switch into a context receiving mode. The method 400 then proceeds to block 456 where the first service hands to the second service the customizable, tag-based file containing the state of the first service. The method 400 then proceeds to another continuation terminal ("terminal C3").

From terminal C3 (FIG. 4G), the second service receives the customizable, tag-based file and initializes itself into the state specified by the customizable, tag-based file. See block 460. (Preferably, the second service initializes various data structures at lower networking layers for effective initialization of a networking protocol that binds to the network interfaces.) A test is performed at decision block 462 to determine whether the second service has finished initialization. If the answer to the test at decision block 462 is NO, the method 400 loops back to block 460 where the above-described processing steps are repeated. Otherwise, the answer to the test at decision block 462 is YES, and the second service notifies this first service that the initialization was a success. See block 464. Next, at block 466, the first service sends a message to the second service to begin operation. The method 400 then proceeds to another continuation terminal ("terminal C4").

From terminal C4 (FIG. 4H), the method 400 proceeds to decision block 468 where a test is performed to determine whether the second service has acknowledged. If the answer is NO to the test at decision block 468, the method 400 loops until the answer is YES. If the answer is YES to the test at decision block 468, the first service indicates that the updating of the first service was a success. See block 470. At block 472, the first service releases the handoff lock. The method 400 then causes the first service to stop from further execution in preparation for being uninstalled. See block 474. (Preferably, the method causes the service control manager 316 to invoke the ONSTOP( ) routine 318C and another routine for the uninstallation of the first service.) The first service is then uninstalled. See block 476. The method 400 then continues to the exit terminal D.

From terminal D (FIG. 4A), the method 400 proceeds to a set of method steps 406 defined between a continuation terminal ("terminal E") and another continuation terminal ("terminal F"). The set of method steps 406 allows the instance of the first service (the second service or the updated service 312B), which has been modified with the updates, to execute and to service clients of the first service. The method 400 then terminates execution.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer system for serving requests from clients, comprising:
   a computing device comprising a processing unit;
   a memory having a communication path with said processor, the memory having stored thereon:
   a first computer program executable in a first guest operating system running on the computing device that upon execution causes the computing device to service a request of one of the clients, the computing device capable of receiving a context provided by the client associated with the first computer program; and
   a second computer program executable in a second guest operating system running on the computing device that upon execution performs substantially similar functions to the functions caused by the first computer program, the second computer program operable to contemporaneously execute on the computing device with the first computer program so as to allow tests to be performed on the second computer program after which the second computer program can be executed and the first computer program can be terminated after a state of the first computer program is transferred to the second computer program and the context of the client is transferred to the second computer program without losing the context provided by the client, wherein the state is generated by execution of the first computer program in connection with the servicing of the clients.

2. The computer system of claim 1, wherein the first guest operating system executes on a first virtual machine and the second guest operating system executes on a second virtual machine.

3. The computer system of claim 2, wherein the first guest operating system and the second guest operating system are managed by a virtual server, which provides an emulation of hardware.

4. The computer system of claim 3, wherein the virtual server runs as a service in a host operating system, which directly communicates with hardware.

5. The system of claim 1 wherein the first and second computer programs comprise computer executable instructions for causing a transition of one service mode to another service mode, the service modes comprising:
   a service for servicing requests of clients, the service including a mode among multiple modes that allows the service to obtain a handoff lock and export the state of the service; and
   a service control manager for causing the service to enter into a particular mode by invoking an assigned callback routine associated with the particular mode, one particular mode including a customizable mode that allows the service to obtain the handoff lock and export the state of the service.

6. The system of claim 5, further comprising an instance of the service that receives the state of the service, the instance of the service being updated by a new release of the service so as to add a new feature or correct an error in the service.

7. The system of claim 6, wherein the mode includes a pause mode in which the service ceases to receive further requests from clients.

8. The system of claim 7, wherein the mode includes a start mode and a stop mode in which the service is started and stopped by the service control manager.

9. The system of claim 8, wherein the mode includes an install mode and an uninstall mode in which the service is installed and uninstalled by the service control manager.

10. A method implemented on a computer system, comprising:
    receiving updates to a first service running on a first guest operating system that runs on the computer system, the first service performing requests of clients;
    performing a state handoff by the first service to produce a file containing the state of the first service and a context provided by one of the clients, the file being exported to an instance of the first service running on a second guest operating system that runs on the computer system; and
    executing by the instance of the first service, which is updated by the received updates, service requests of the clients; and
    terminating the first service, after performing the state handoff, on the first guest operating systems so that the ongoing service requests of the clients are handled by the updated instance of the first service running on the second operating system without losing the context provided by the clients to the first service.

11. The method of claim 10, further comprising testing the instance of the first service with the updates prior to the act of performing the state handoff.

12. The method of claim 11, further comprising causing the first service to enter a handoff mode after the act of testing but prior to the act of performing the state handoff.

13. The method of claim 12, further comprising pausing the first service so as to prevent the first service from receiving further requests from clients.

14. The method of claim 13, further comprising obtaining a handoff lock so as to prevent changes to the state of the first service, the act of obtaining the handoff lock occurring prior to the act of producing the file containing the state of the first service.

15. The method of claim 14, wherein the act of producing the file includes producing a customizable, tag-based file with tags containing internal context as well as external context of the first service.

16. The method of claim 15, further comprising remapping network connections and listening ports from the first service to the instance of the first service so as to allow requests of clients to be redirected to the instance of the first service.

17. The method of claim 16, wherein the handoff lock is released by the first service when the instance of the first service indicates a successful handoff of the state of the first service.

\* \* \* \* \*